Figure 1:
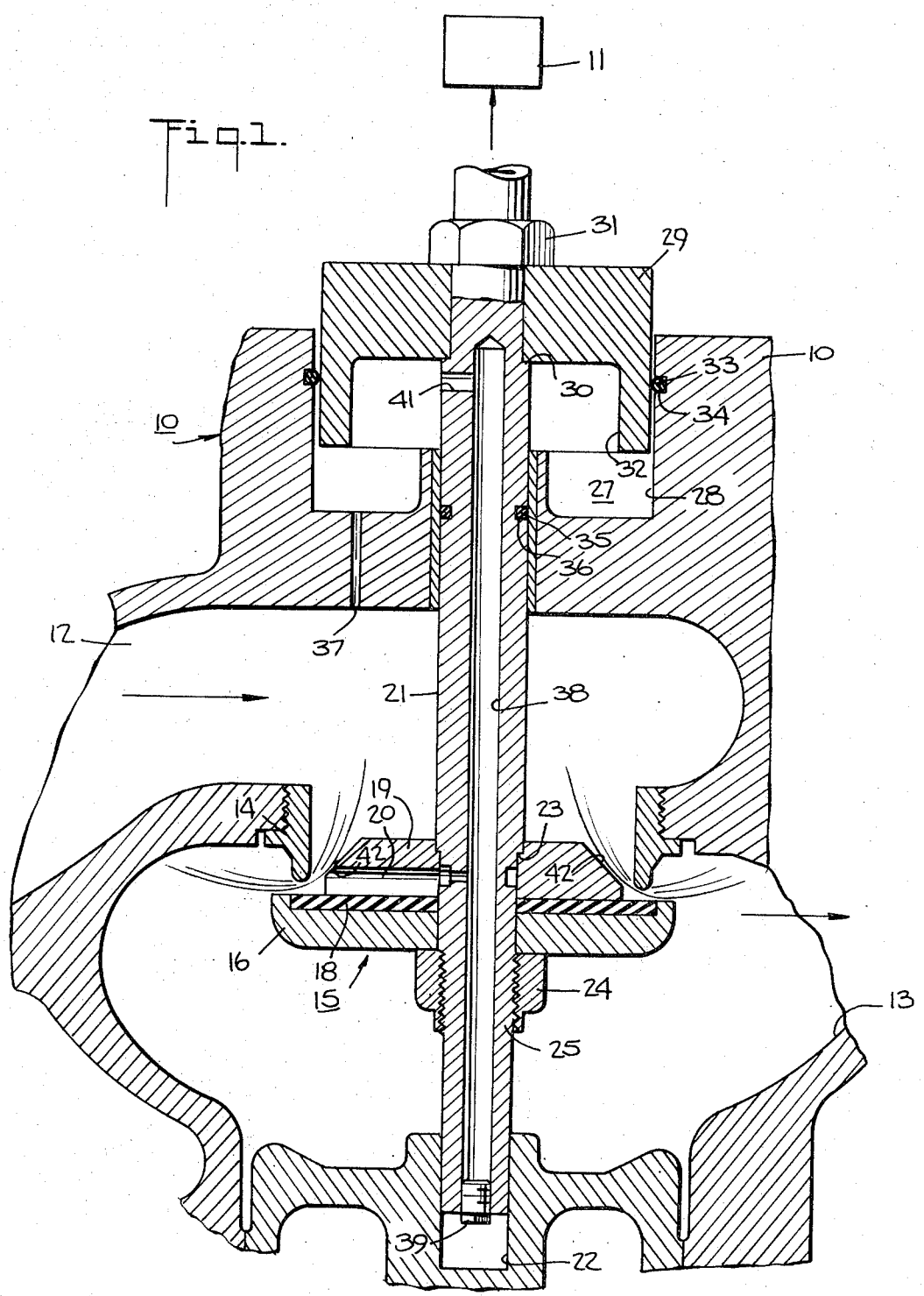

United States Patent [19]

Illing

[11] 3,873,063
[45] Mar. 25, 1975

[54] ASPIRATED BALANCE PISTON

[75] Inventor: Henry Illing, Parksville, N.Y.

[73] Assignee: Kieley & Mueller, Inc., Middletown, N.Y.

[22] Filed: Nov. 1, 1973

[21] Appl. No.: 411,803

[52] U.S. Cl.......... 251/282, 137/484.8, 137/505.18, 251/325
[51] Int. Cl............................................. F16k 17/34
[58] Field of Search.................. 251/281, 282, 325; 137/484.4, 484.6, 484.8, 505.18

[56] References Cited
UNITED STATES PATENTS

| | | | |
|---|---|---|---|
| 2,599,577 | 6/1952 | Norgren | 137/484.8 |
| 2,707,966 | 5/1955 | Taplin | 137/484.8 X |
| 2,805,039 | 9/1957 | Angelery | 251/282 X |
| 2,806,481 | 9/1957 | Faust | 137/484.8 X |
| 3,392,749 | 7/1968 | Gneiding et al. | 137/505.18 X |
| 3,545,471 | 12/1970 | Taplin | 137/484.8 X |
| 3,576,193 | 4/1971 | Rothfuss | 137/613 X |
| 3,756,283 | 9/1973 | Angelery | 251/282 X |

*Primary Examiner*—Charles J. Myhre
*Assistant Examiner*—Ira S. Lazarus
*Attorney, Agent, or Firm*—Kenyon & Kenyon Reilly Carr & Chapin

[57] ABSTRACT

In order to improve the balance of fluid forces existing in a balance plug innervalve assembly, a pressure tap is made at the approximate location of the lowest static pressure upstream of the disc seating surface and in close proximity to the vena contracta in order to aspirate the balance piston pressure chamber. This tap allows the lower static pressure to be transmitted to the balance piston by tubing or through a drilled passage in the valve stem to impart a modified piston force that is a closer balance of innervalve force. With this improved force balance, the initial droop is decreased in a self-contained regulator. In a balance piston-type globe valve the actuator size is reduced.

8 Claims, 3 Drawing Figures

3,873,063

ASPIRATED BALANCE PISTON

This invention relates to an aspirated balance piston.

Heretofore, various types of pressure regulators have been known in which the position of a valve plug with respect to a valve seat, that is, the size of the opening in the valve, is regulated so that a constant delivery pressure can be maintained regardless of any variation in the initial pressure of the fluid flow through the valve. Generally, these pressure regulators have connected the valve stem to a spring or diaphragm-like unit which is pressure responsive to the fluid pressure at the delivery end of the pressure regulator. For example, various tubes have been incorporated within the regulators in order to communicate the delivery side of the regulator with a pressure chamber containing a pressure fluid. The pressure fluid is then used to work against the spring or diaphragm to cause the spring or diaphragm to move the valve stem in dependence upon the change in delivery pressure. For example, if the pressure decreases, the spring or diaphragm is actuated to further open the valve. If the pressure increases, then the valve stem and valve plug are moved in a valve closing direction.

In many of these instances, a communication tube extends to the downstream side of the valve. In some cases, high velocity is produced by restricting the outlet of the valve to lower the static pressure downstream and to feed this pressure to the main diaphragm. This restriction, however, creates losses which results in a lower $C_r$ and partially cancel the desired aspiration effect. In addition, the use of an aspirated tube in this fashion has no effect at all in the initial opening of the valve since the downstream flow velocity, even at a restricted section, is too low to cause any effective lowering of static pressure.

As is further known, globe valves which utilize balance pistons do not contain aspiration devices for the mitigation of Bernoulli suction effects. As a result, in order to overcome the initial forces which appear at the opening of a globe valve, the valve actuators have required relatively large constructions. As is known, in some cases, these globe valves have sometimes refused to open under the usually applied forces due to an unbalanced condition on the valve body.

Accordingly, it is an object of this invention to dynamically compensate for any lack of balance introduced by local high velocities near a disc seating surface, that is, to compensate for Bernoulli suction.

It is another object of the invention to obtain a modified piston force on a balanced piston that is in closer balance with an innervalve force.

It is another object of the invention to decrease the initial droop in a self-contained regulator.

It is another object of the invention to reduce the actuator size in a globe valve of the balance piston-type.

It is another object of the invention to eliminate any refusal of a globe valve to open due to an unbalancing condition on an innervalve.

It is another object of the invention to improve the desirable pressure balance at partial stroke in a valve.

It is another object of the invention to improve droop performance throughout the stroke of a self-contained regulator.

Briefly, the invention is directed to a valve having a housing defining an inlet and an outlet, a valve seat, an innervalve plug for sealingly seating on the valve seat, a pressure chamber and a balance piston slidably mounted in the pressure chamber and connected to the valve stem. In accordance with the invention, the valve is provided with a means communicating the balance piston pressure chamber with a point adjacent the opening in the valve seat upstream of the valve plug in order to effect a pressure tap in close proximity to the vena contracta of a fluid flowing through the opening when the innervalve plug is spaced from the valve seat. In this way, the low static pressure existing at this high velocity is transmitted to the pressure chamber to cause aspiration of the chamber in order to obtain a modified piston force.

In one embodiment, the means for effecting the pressure tap includes one or more milled slots or bores in the innervalve plug which extends substantially radially from a point adjacent to the valve seat inwardly to a communication passage running axially of the valve stem. In addition, a bore is disposed radially in the valve stem within the confines of the pressure chamber to communicate the communication passage with the pressure chamber. In this way, a direct line of communication is established between the pressure chamber and the point approximating the vena contracta of the fluid passing through the valve when the valve is open.

Figure 2:
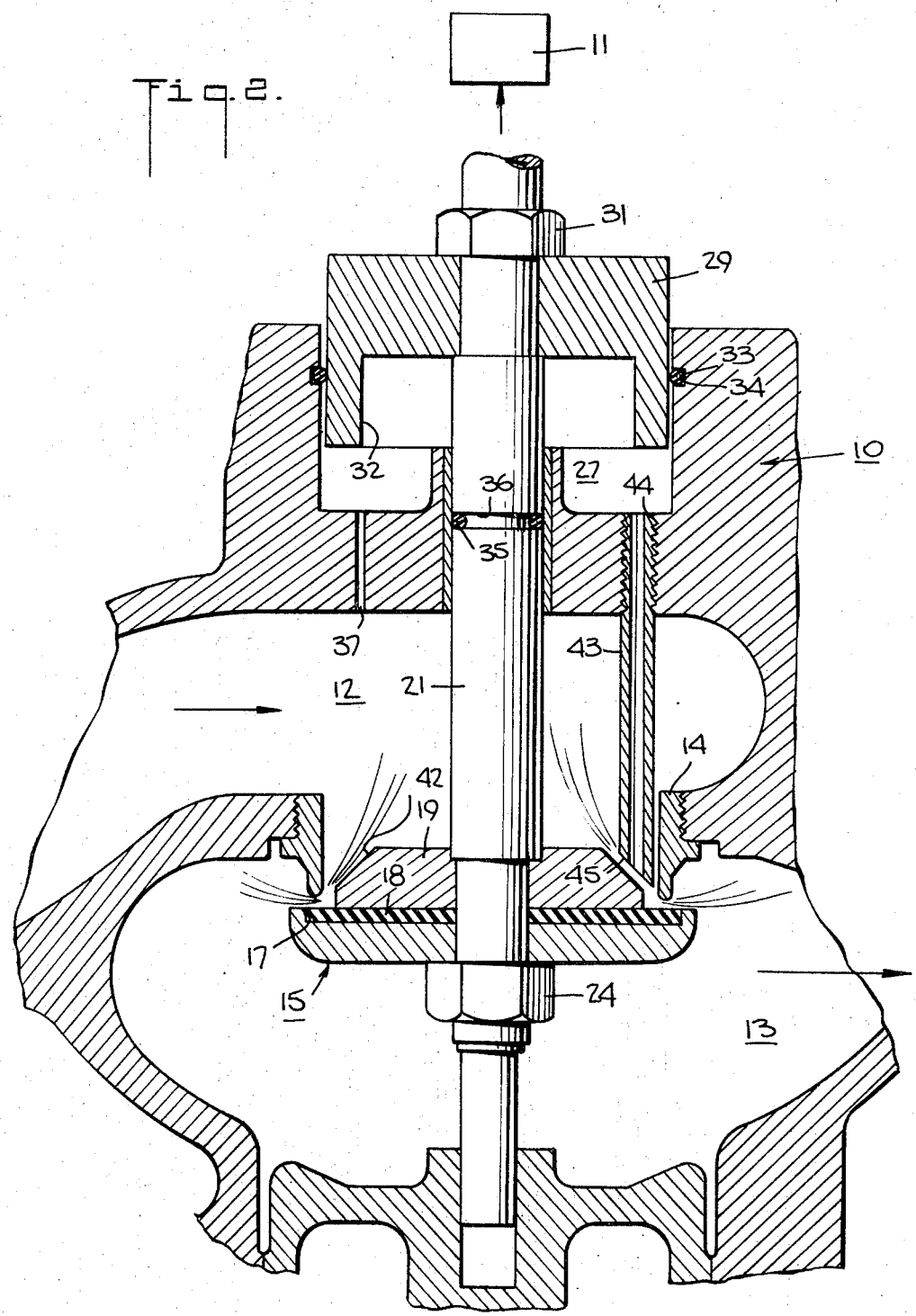
Figure 3:
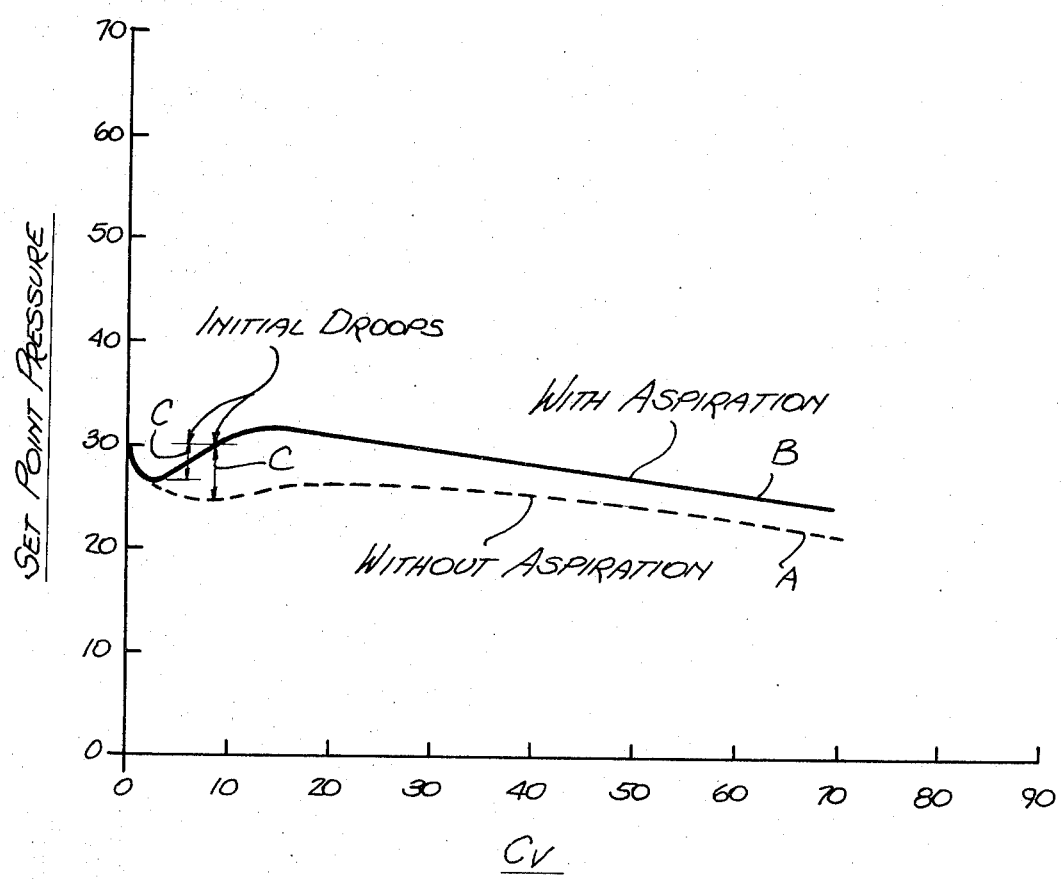

In another embodiment, the means to effect the pressure tap is in the form of an aspirator tube which communicates the pressure chamber directly with the approximate point of the vena contracta of the fluid. This tube extends from the pressure chamber through the inlet chamber of the valve body. These and other objects and advantages of the invention will become more apparent from the following detailed description and appended claims taken in conjunction with the accompanying drawings in which:

FIG. 1 illustrates a cross-sectional view of one embodiment of the invention in a valve;

FIG. 2 illustrates a cross-sectional view of the second embodiment of the invention in a valve; and FIG. 3 graphically illustrates the effect of the invention of the initial droop of a valve constructed in accordance with the invention. Referring to FIG. 1, the valve includes a housing 10 of substantially conventional structure, as is known, which cooperates with a suitable actuator 11 such as the diaphragm (not shown). The valve housing or body 10 includes an inlet 12 for the inflow of a fluid and an outlet 13 for the outflow of a fluid. Intermediate the inlet 12 and outlet 13 is an annular seat 14 which is secured within the housing 10 in a suitable manner, such as by threading, to define an opening. In addition, as is known, an innervalve plug 15 which is adapted to close the opening formed by the valve seat 14, is movably mounted within the housing 10 downstream of the valve seat 14 with respect to the flow of fluid.

The innervalve plug 15 is formed as a disc assembly which includes a main portion 16 having a recess 17 in which a sealing disc 18 is mounted for sealingly mating against the lower annular periphery of the valve seat 14. In addition, the innervalve plus 15 has a secondary plug portion 19 seated over the sealing disc 18. This secondary plug portion 19 has one or more bores or slots 20 milled in the underside for purposes as explained below. The innervalve plug 15 is mounted in a fixed manner on a valve stem 21 which, in turn, is guided at the lower end, as viewed, in a guideway 22 of the housing 10. As shown, the valve stem 21 has a shoulder 23 against which a shoulder of the secondary plug portion 19 of the innervalve plug 15 abuts. Also, a locking nut 24 is threaded onto a threaded section 25 of the valve stem 21 to abut the main portion 16 of the innervalve plug 15 and thereby secure the plug 15 in place. In addition, the valve stem 21 is slidably mounted within a bushing 26 in the housing 10 above the inlet 12 for vertical motion within the housing 10 and extends out of the housing 10 to connect to the actuator 11 in known manner.

The housing 10 also includes a pressure chamber 27 which is defined, in part, by a recess 28 in the upper end of the housing 10 and by a balance piston 29 which is fixedly mounted on the valve stem 21. To this end, the balance piston 29 is abutted against a shoulder 30 on the valve stem 21 and is fixed in place by a nut 31 threaded on the valve stem 21. As shown, the balance piston 29 has an internal cavity 32 exposed to the chamber 27. In addition, a seal 33 such as an O-ring is mounted within a groove 34 in the recess 28 of the housing to sealingly ride on the outer periphery of the balance piston 29. A similar seal 35 is mounted in an annular groove 36 of the valve stem 21 to ride against the bushing 26 in order to seal the pressure chamber 27 from the inlet 12.

The housing 10 is provided with a bias port 37 which communicates the inlet 12 with the pressure chamber 27 for reasons as explained below.

The valve stem 21 is provided with a means to communicate the pressure chamber 27 with a point adjacent the opening in the valve seat 14 upstream of the innervalve plug 15 in order to effect a pressure tap in close proximity to the vena contracta of a fluid flowing through the opening when the plug 15 is spaced from the valve seat 14. This means includes a communication passage 38 in the valve stem 21 which passage 38 is formed, for example, by a bore extending from the lower end of the valve stem 21 to a point located within the recess 32 of the balance piston 29. A threaded plug 39 is threaded into the lower end of the valve stem 21 in order to close off the communication passage 38 from the recess 22 of the housing 10. In addition, the communication means includes one or more ports 40 each of which communicates with a respective bore 20 in the secondary body portion 19. Also, one or more bores 41 are provided in the valve stem to communicate the passage 38 with the recess 32 of the balance piston 29.

As shown, the bores 20 in the secondary plug portion 19 extend in close proximity to the opening formed by the valve seat 14. In addition, the secondary plug portion 19 is provided with a tapered or similar surface 42 at the outermost peripheral edge in order to cooperate with the valve seat 14 to define a smooth flow path for a fluid passing through the opening in the valve seat 14. The secondary plug portion 19 is also made of a diameter such that the bores 20 extend in close proximity to the inner wall of the valve seat 14 and are disposed in close proximity to the vena contracta of a flow of fluid passing between the valve seat 14 and innervalve plug 15 when the valve is opened. In this way, the lower static pressure obtainable in the opening can be transmitted to the balance piston pressure chamber 27 for a given flow of fluid.

In operation, with the valve in a closed position, the fluid in the inlet 12 is sealed off from the outlet 13 but is in communication with fluid in the pressure chamber 27 by way of the bias port 37 as well as via the ports 20, 40, 41 and passage 38. Thus, the pressure of the fluid in the inlet 12 and in the pressure chamber 27 is the same. In order to open the valve, the actuator 11 is operated in any suitable manner. As the valve plug 15 begins to move away from the valve seat 14, a flow of fluid passes out of the resulting opening. Depending upon the pressure differential between the inlet 12 and the outlet 13, the flow of fluid issues at a relatively high velocity between the valve seat 14 and plug 15. Since the bores 20 are in close proximity to the vena contracta of this fluid flow, the communication passage 38 is subjected to a differential pressure, namely, the difference between the static pressure at the vena contracta of the fluid flow and the initial pressure in the pressure chamber 27. Since the static pressure at the vena contracta is usually lower than the pressure in the pressure chamber 27, the pressure fluid in the pressure chamber 27 will be aspirated via the bores 41, communication passage 38 and bores 20 into the issuing fluid flow into the outlet 13. Thus, the pressure of the fluid in the pressure chamber 27 will more accurately correspond to the actual pressure in the inlet 12 and on the inner valve plug 15 so that a balance of forces will be maintained on the innervalve plug 15. That is, the pressure in the chamber 27 tending to force the innervalve plug 15 into a closed position will substantially equal the pressure in the inlet 12 tending to force the innervalve plug 15 into an open position.

Referring to FIG. 2, wherein like reference characters indicate like parts as above, instead of using a communication means which passes through the valve stem 21, the means can communicate the balance piston pressure chamber 27 directly with a point adjacent to the vena contracta of the fluid flow passing out of the valve seat 14. As shown, this means includes an aspirator tube 43 which is threadably mounted in a threaded bore 44 of the housing 10 between the pressure chamber 27 and the inlet 12. The aspirator tube 43 has a tapered lower end 45 which corresponds to the shape of the edge 42 of the secondary body portion 19 of the innervalve plug 15. This lower edge 45 is disposed between the edge 42 of the secondary plug portion 19 and the inner circumferential wall of the valve seat 14 and extends downwardly into the fluid flow to communicate directly with the vena contracta of the flow passing through the valve.

In operation, as the valve is opened, the static pressure in the vena contracta of the fluid flow operates on the aspirated tube 43 to set up a pressure differential across the tube 43 so that fluid is drawn from the pressure chamber 27 into the flow. In this way, an accurate balance of the forces of the innervalve plug 15 is achieved.

Depending upon the amount or quantity of aspiration required for a particular valve, such can be adjusted by variation of the relative size of the bias port 37 and the aspirator port defined by the bores 20, 40, 41 and communication passage 38 as shown in FIG. 1 and the bias port 37 and aspirator port defined by the aspirator tube 43 in FIG. 2.

The invention thus provides a valve in which a minimum of force is required by the actuator in order to open the valve.

Furthermore, since the aspiration effect of the valve occurs substantially simultaneously with the opening of the valve, the initial droop of the valve will be small, if any. Referring to FIG. 3, the curve A represents the $C_r$ characteristic versus set point pressure for a valve such as a 4 inch 4027 valve manufactured by Kieley & Mueller, Incorporated which is not provided with an aspiration means. The curve B represents the same parameters for the same valve equipped with an aspiration tube as in FIG. 2. As can be seen, the initial droop C in the curve B is less than for curve A.

During operation, when the valve is in a fully open or an intermediately opened position, the pressure tapped off from the fluid flow will generally be in correspondence to the static pressure of the flow rather than to the velocity pressure of the flow.

The invention further provides a valve which is able to dynamically compensate for any lack of balance introduced by local high velocities near the seating surfaces of the sealing disc 18 on the valve seat 14 in order to compensate for Bernoulli suction.

What is claimed is:

1. In a valve having
   a valve body having an inlet and an outlet;
   a valve seat within said valve body defining an opening communicating said inlet with said outlet;
   an innervalve plug for sealingly seating on said valve seat to seal said opening;
   a valve stem connected to said innervalve plug;
   a balance piston slidably mounted in said valve body to define a pressure chamber therewith, said piston being connected with said valve stem;
   a bias port in said valve body communicating said inlet with said pressure chamber; and
   means communicating said pressure chamber with a point adjacent said opening upstream of said innervalve plug to effect a pressure tap in close proximity to the vena contracta of a fluid flowing through said opening with said innervalve plug spaced from said valve seat.

2. In a valve as set forth in claim 1 said means including a plurality of bores in said body extending from a point adjacent said valve seat, and a communication passage in said stem communicating said bores with said pressure chamber.

3. In a valve as set forth in claim 1 said means is an aspirator tube extending from said pressure chamber.

4. A globe valve having
   a housing;
   a valve seat within said housing;
   an innervalve plug downstream of said seat for seating thereon;
   a pressure chamber in said housing;
   means connected to said innervalve plug for moving said plug relative to said seat, said means including a balance piston slidably mounted in said pressure chamber; and
   means communicating said pressure chamber with a point adjacent said seat to effect a pressure tap in close proximity to the vena contracta of a fluid flowing between said plug and said seat and to aspirate said chamber to effect a balanced force on said innervalve plug.

5. A globe valve as set forth in claim 4 further having an inlet in said housing for a flow of fluid and a bias port communicating said inlet with said pressure chamber.

6. A globe valve as set forth in claim 4 wherein said means for moving said plug includes a valve stem slidably mounted in said housing and connected between said balance piston and said innervalve plug.

7. A globe valve as set forth in claim 6 wherein said means communicating said pressure chamber with said point includes a passage means extending through said plug and said stem and opening into said pressure chamber.

8. A globe valve as set forth in claim 4 wherein said means communicating said pressure chamber with said point is a tube extending from said chamber to said point.

* * * * *